United States Patent [19]

Hawver et al.

[11] Patent Number: 5,767,950
[45] Date of Patent: Jun. 16, 1998

[54] METHOD AND APPARATUS FOR CALIBRATING IRIS OF PHOTOGRAPHIC PRINTER

[75] Inventors: Jeffery Richard Hawver; Michael Joseph O'Brien, both of Rochester; Andrea S. Rivers, Bloomfield, all of N.Y.

[73] Assignee: Eastman Kodak Company, Rochester, N.Y.

[21] Appl. No.: 632,204

[22] Filed: Apr. 15, 1996

[51] Int. Cl.⁶ .................................................. G03B 27/72
[52] U.S. Cl. .......................................... 355/71; 355/38
[58] Field of Search ............................. 355/71, 38, 68, 355/67; 356/233

[56] References Cited

U.S. PATENT DOCUMENTS

| | | | |
|---|---|---|---|
| 2,393,408 | 1/1946 | Peterson | 95/64 |
| 3,744,393 | 7/1973 | Uchiyama et al. | 95/64 |
| 3,807,857 | 4/1974 | Rubin | 355/68 |
| 3,819,373 | 6/1974 | Sable | 96/23 |
| 3,891,317 | 6/1975 | Walker | 355/68 |
| 4,444,489 | 4/1984 | Bartel et al. | 355/35 |
| 4,470,687 | 9/1984 | Saito et al. | 354/435 |
| 4,769,667 | 9/1988 | Ishiguro et al. | 354/435 |
| 4,961,087 | 10/1990 | Gandini et al. | 355/71 |
| 5,038,168 | 8/1991 | Kurimoto et al. | 355/56 |
| 5,325,142 | 6/1994 | Depatie et al. | 354/234.1 |
| 5,333,011 | 7/1994 | Thompson et al. | 348/363 |
| 5,424,804 | 6/1995 | Pultorak | 355/68 |
| 5,515,138 | 5/1996 | Hasegawa et al. | 355/67 |
| 5,663,784 | 9/1997 | Tanimoto | 355/68 |

*Primary Examiner*—Safet Metjahic
*Assistant Examiner*—John Chizmar
*Attorney, Agent, or Firm*—Charles E. Snee, III; Gordon M. Stewart

[57] ABSTRACT

An adjustable iris diaphragm assembly (26) in a zoom lens system (16) of a photographic printer (10) is calibrated for each magnification setting by progressively adjusting the aperture opening until a predetermined light intensity is detected by a sensor (36) near a paper plane of the printer and then determining an output voltage of a feedback sensor (88) of the iris diaphragm assembly. A correlation is established among magnification settings of the printer, iris stop settings, and sensor output voltages to enable the printer to accurately set the iris for a desired exposure.

14 Claims, 4 Drawing Sheets

METHOD AND APPARATUS FOR CALIBRATING IRIS OF PHOTOGRAPHIC PRINTER

TECHNICAL FIELD

The invention concerns methods and apparatus for producing photographic prints. More particularly, the invention relates to methods and apparatus for calibrating an adjustable iris used in association with a zoom lens in such a photographic printer.

BACKGROUND OF THE INVENTION

Cameras are known which have a capability of providing images in a plurality of sizes or formats on a single filmstrip. For example, cameras are known which can take interspersed standard, portrait and panoramic size pictures.

In order for a high speed photographic printer to print photographs from filmstrips having such interspersed sizes, a zoom lens in the printer must be capable of switching quickly and precisely between magnifications needed for the different sizes. One such zoom lens is disclosed in commonly assigned, copending U.S. patent application Ser. No. 60/000,626 filed Jun. 30, 1995, which is incorporated by reference into this application.

To enable photographic printers with zoom lenses to properly expose successive images at different magnifications, the printer must not only adjust the zoom lens precisely to each magnification, but also must adjust an aperture in an iris associated with the zoom lens to ensure that the proper intensity of light reaches the photographic paper. For example, U.S. Pat. No. 5,038,168 discloses a photographic printer with a zoom lens in which for each magnification, an optimum aperture size is determined and exposure time is controlled to provide a constant exposure at the paper plane. While such zoom lens systems provide certain advantages, a need has existed for a technique for calibrating the associated iris to allow for a wider variety of settings at each level of magnification of the zoom lens. In addition, since the iris used in such systems must be able to change rapidly and accurately among a variety of apertures for different magnifications and must do so over an extended lifetime, a need has existed for a rapid and accurate technique for recalibrating the iris to account for changes in performance due to changes in ambient conditions and expected wear and tear.

SUMMARY OF THE INVENTION

A primary objective of the invention is to provide a method and apparatus for calibrating an adjustable iris in a zoom lens system, to ensure precise setting of the aperture of the iris during operation of an associated photographic printer.

A further objective is to provide such a method and apparatus which will account for variations in ambient conditions and wear of optical, mechanical and electrical components.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The apparatus and method of the invention are useful for calibrating an adjustable iris in a photographic printer including a light source, a sensor intended to produce a variable output in response to changes in an aperture of the iris, a lens system for projecting an image from a photographic negative illuminated by the light source, and an image plane where the projected image is received by a photographic paper, the iris being located in a light path from the light source so as to control an amount of light passing from the negative through the lens system to the paper. For this purpose, the invention may include steps or apparatus for a) setting the iris at a reference aperture for a reference magnification of the lens system; b) near the image plane, measuring a reference intensity of light transmitted from the light source through the iris, in an absence of a photographic negative; c) calculating a modified intensity of light to be measured near the image plane after a predetermined change in stop number of the iris; d) changing the aperture of the iris in a direction to cause the intensity of light near the image plane to change from the reference intensity to the calculated modified intensity; e) during the changing, measuring the intensity of light near the image plane; f) stopping the changing of the aperture when the intensity measured near the image plane equals the calculated modified intensity; g) measuring an output Sv of the sensor when the intensity of light near the image plane equals the calculated modified intensity; h) repeating c) to g) for successive predetermined changes in stop number of the iris; and i) storing for use during operation of the photographic printer a correlation for each changed stop number among magnification settings of the lens system, the changed stop number and the output of the sensor at the changed stop number.

The reference aperture may be a maximum aperture for the reference magnification and the changing step may reduce the area of the aperture. The lens system may be a zoom lens having a plurality of magnification settings, in which case method steps or apparatus may be provided for j) changing the magnification setting of the lens system to a lower magnification; k) changing the aperture of the iris in a direction to cause the intensity of light near the image plane to equal the reference intensity; and l) repeating c) to i) for the lower magnification.

Alternatively, method steps or apparatus may be provided for j) calculating a modified reference intensity by multiplying the reference intensity by the square of the quantity: the reference magnification divided by a changed magnification; k) changing the aperture of the iris in a direction to cause the intensity of light near the image plane to equal the modified reference intensity; and l) repeating steps c) to i) for the changed magnification.

Where the output of the sensor varies from a maximum to a minimum aperture of the iris, method steps or apparatus may be provided for, prior to setting the iris at the reference aperture, at an ambient temperature of sensor, determining an output C1 of the sensor corresponding to a predetermined maximum aperture and determining an output C2 of the sensor corresponding to a predetermined minimum aperture; and calculating a modified sensor output for the storing step, in accordance with the following relationship:

$$LUT(n) = (Sv(n) - C1)/(C2 - C1),$$

where LUT(n) is a look up table value to be stored, n is an aperture number and Sv(n) is the sensor output at aperture n.

The method and apparatus of the invention provide various advantages. The iris of a zoom lens system can be calibrated for a plurality of stop settings at each magnification of the lens system. Variations can be accommodated in sensor performance with temperature; in optical, mechanical and electrical performance of iris assemblies; and in changes in performance characteristics over the life time of the iris assembly.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
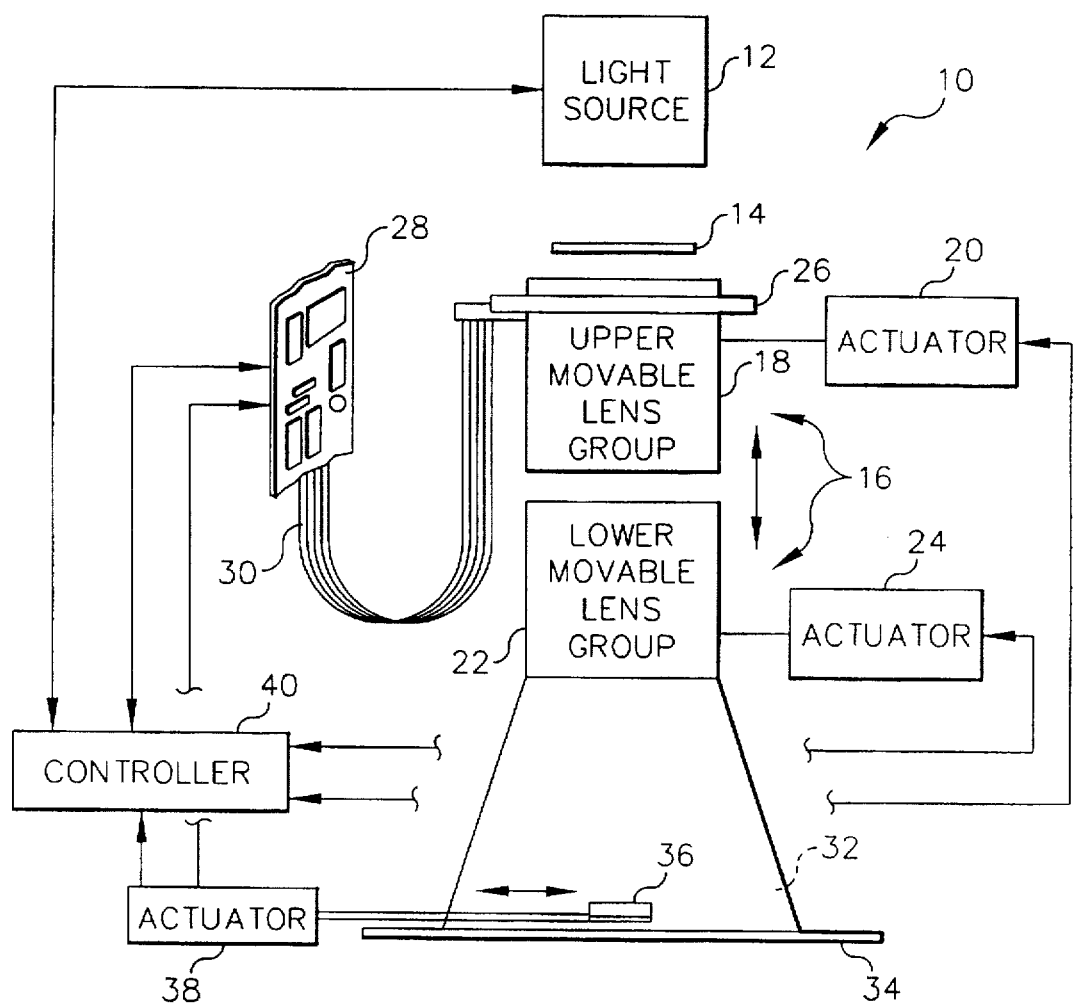
FIG. 1 shows schematically a photographic printer including an iris which can be calibrated in accordance with our invention.

The following is a detailed description of the preferred embodiments of the invention, reference being made to the drawings in which the same reference numerals identify the same elements of structure in each of the several Figures.

FIG. 1 shows schematically a photographic printer 10 in which the invention can be used. A light source 12 projects light through a negative filmstrip 14. The transmitted light passes through an upper movable lens group 18 operatively connected to an actuator 20 and then through a lower movable lens group 22 operatively connected to an actuator 24. An adjustable iris diaphragm assembly 26 is mounted to move with lens group 18. The size of an aperture in assembly 26 can be adjusted to control the amount of light passing through the zoom lens system, as needed for printing photographs. Iris control electronics 28 may be provided on an adjacent circuit board which is connected to assembly 26 by a flexible cable 30. At the lower end of lens group 22, a beam of light 32 is projected to an image plane at which a strip 34 of photographic paper is positioned. A selectively positionable calibration sensor or photometer 36 may be selectively positioned near the image plane to measure intensity of light transmitted through zoom lens system and iris diaphragm assembly. Alternatively, a mirror may be positioned within beam 32 to reflect light to a sensor, not illustrated. An actuator 38 is operatively connected to sensor 36 to control its movement into beam 32 for calibrating of the iris diaphragm assembly and out of beam 32 for exposing photographs on paper 34, under the guidance of a conventional programmable controller 40. For overall control of printer 10, controller 40 also is operatively connected to light source 12, actuators 20, 24, control electronics 28, sensor 36 and actuator 38.

Figure 2:
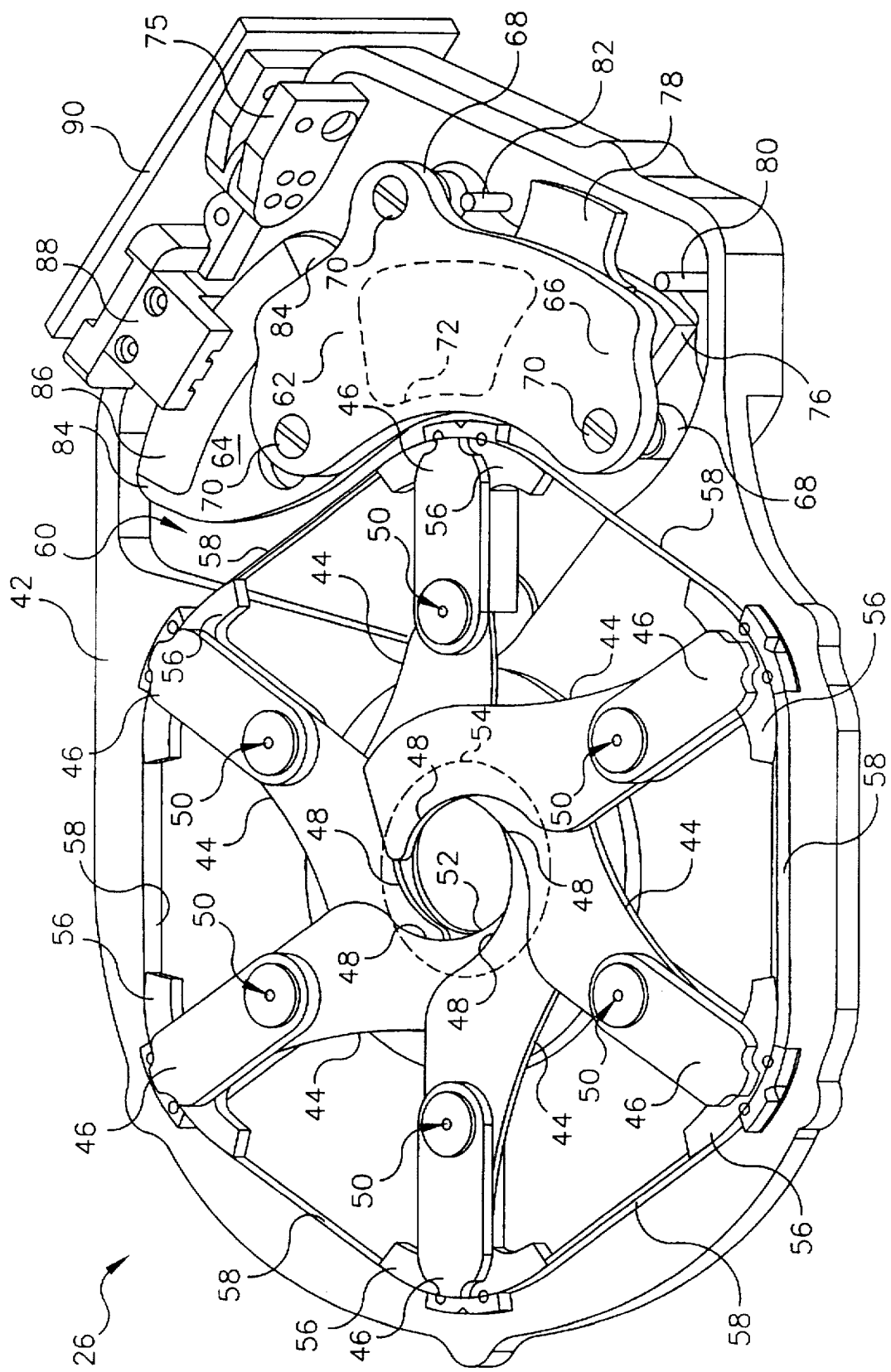
FIG. 2 shows a perspective view of one type of iris suitable for calibration in accordance with the invention.

FIG. 2 shows one suitable version of iris diaphragm assembly 26, which is the subject of commonly assigned, copending U.S. patent application Ser. No. 08/444,457, filed May 19, 1995, which is incorporated by reference into this application. A plate-like frame 42 supports a plurality of movable iris blades 44, each having a stem portion 46 and a curved end portion 48. A plurality of pivot pins 50 rotatably support the iris blades so that their curved end portions define a variable aperture 52. A reference aperture 54, shown in dotted line, is provided through frame 42 to establish a fixed, reference aperture for the printer of, for example, about 18 mm diameter. An identically sized reference aperture is provided in a cover plate for the assembly, not illustrated. At the outer ends of the stem portions are mounted yokes 56 to which is mounted a circumferentially extending drive belt 58.

A recess 60 is provided in frame 42 to house a diaphragm actuator 62. A horizontally extended support plate 64 is fixedly attached to the one of yokes 56 closest to recess 60. An elongated top plate 66 is supported and spaced from plate 64 by a trio of support posts 68 and screws 70. Mounted on support plate 64 is an electrical drive coil 72 connected by a suitable flexible connector, not illustrated, to a terminal board 75 at an edge of recess 60. Beneath support plate 60, as viewed in FIG. 2, a bottom wall of recess 60 supports a pair of arcuate permanent magnets 76, only a corner of one of which is visible. Upon flow of current through drive coil 72, the resultant electrical field reacts with the magnetic field of the magnets to cause support plate 64 to swing with its attached stem portion 46 about the nearby pivot 50. This movement is transmitted to the other iris blades by drive belt 58, thereby opening or closing aperture 52, depending on the sense of the current in drive coil 72. A radial projection 78 is provided from support plate 64, to limit movement of the actuator between a pair of fixed stop pins 80, 82 which limit the range of motion of the iris blades between an opening of about 20 mm in diameter and an opening of about 4 mm in diameter.

Figure 3:
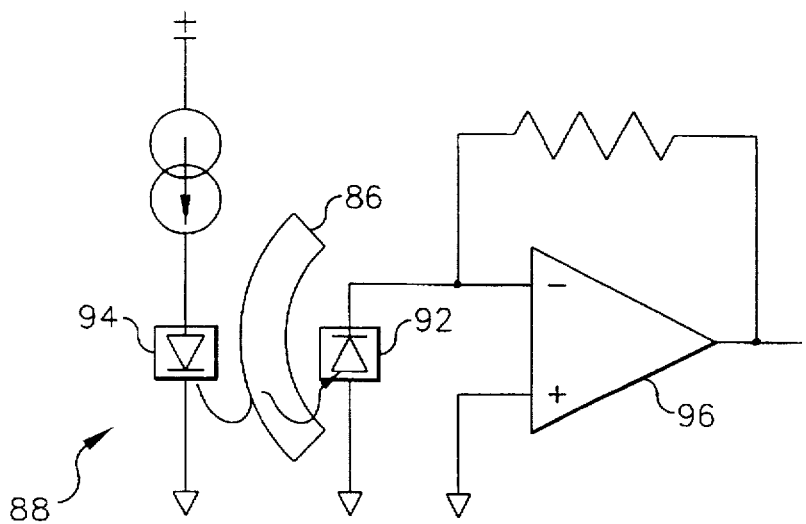
FIG. 3 shows a schematic electrical diagram of a sensor useful to detect a position of the iris of FIG. 2.

At one end of support plate 64, a pair of radial extensions 84 are provided to support between them an arcuate strip 86 of variable optical density. Strip 84 may be of the type disclosed in commonly assigned U.S. Pat. No. 5,325,142, the contents of which are incorporated by reference, which is made of a material whose optical density varies in a known manner along its arcuate length. For example, the material may be a photographic film which has been exposed with a pattern of half tone dots that cause the strip's optical transmission to vary linearly along the length of the arc. The position of strip 86 and, hence, the area of aperture 52, are monitored by a conventional position feedback sensor 88. Sensor 88 and terminal board 75 are connected to an external electrical connection board 90 mounted on an exterior surface of diaphragm assembly 26. As shown in FIG. 3, sensor 88 comprises a photodiode 92 on one side of the strip and an infra-red emitting diode 94 on the other, with an operational amplifier 96 configured as a transimpedance amplifier. Amplifier 96 receives and amplifies the output from photodiode 92 to provide a signal that continually indicates the position of the iris blades, assuming no lost motion in the connecting linkage. Because of the linearly changing density of strip 86, the output of such a sensor may vary from about zero when the iris is fully open to about ten volts when the iris is at its smallest aperture. Other sensor types may be used; however, this type of sensor is preferred due to its compactness, fast response, and non-contact mode of operation.

Figure 4:
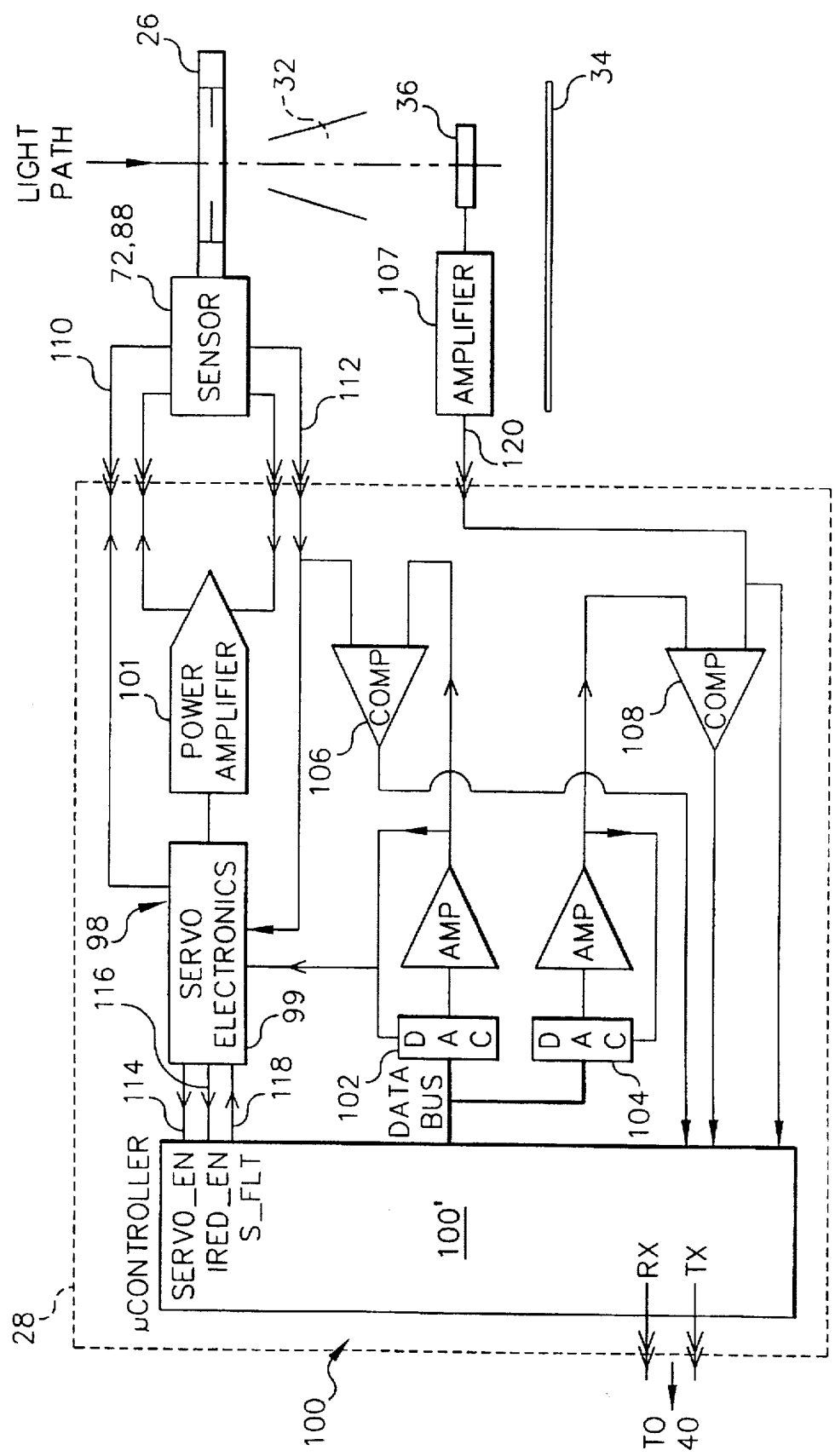
FIG. 4 shows a schematic electrical diagram of a system useful to calibrate the iris of FIG. 2.

As shown in FIG. 4, control electronics 28 comprises two major sections, a servo control section 98 and a microcontroller section 100. Control section 98 includes an electronics section 99 and a power amplifier 101. Microcontroller section 100 includes a conventional MC68HC11A1 eight bit microcontroller chip 100' with 256 bytes of RAM and 512 bytes of EEPROM internal to the chip. The microcontroller section also includes a pair of twelve bit digital to analog converters 102, 104, and a pair of precision comparators 106, 108. The output of the D/A converters, for example, may be unipolar from about zero to about ten volts. The program codes for operating the system may be located in an external 32K EPROM in controller 40, for example.

Sensor 88 is powered from electronics section 99 over line 110. The output voltage from sensor 88 is fed back to section 99 over line 112. To specify a position to be taken by the iris blades, microcontroller 100' sends a voltage signal over a data bus to D/A converter 102 whose output is fed to electronics section 99. A larger voltage decreases, and a smaller one increases, the aperture. In response to the voltage signal, electronics section 99 and power amplifier 101 drive actuator coil in the appropriate direction until the output voltage from sensor 88 is the same as that of D/A converter 102, as determined by comparator 106. The voltage from sensor 88 thus can be measured using converter 102, the same converter used to send an aperture position voltage to electronics section 99, as will be discussed in greater detail subsequently.

In addition to the voltage signal which controls the aperture, three other signals pass between microcontroller 100' and electronics section 99. These are SERVO-EN, IRED-EN and S-FLT. SERVO-EN AND IRED-EN, respectively, are sent from the microcontroller to enable diaphragm actuator 62 and the current to infrared emitting diode 94. When SERVE-EN is a logic high on line 114, the servo loop is enabled and the iris is driven to the position specified by the voltage signal from the microcontroller via D/A converter 102. When SERVO-EN is a logic low, the servo loop is disabled and the actuator 62 will be held either full open against stop 80 or full closed against stop 82, depending on which stop is closer. S-FLT is sent to microcontroller 100' from electronics section 99. When S-FLT is a logic low, some fault condition exists in servo control section 98 which prevents moving the iris to a commanded aperture.

FIG. 4 also shows an amplifier 107 for signals from sensor 36. Output from amplifier 107 is carried over a shielded cable 120 to the microcontroller section. Power for sensor 36 also may be provided over cable 120. Output from amplifier 107 is compared by comparator 108 with a voltage signal from microcontroller 100'. In this way, the microcontroller can measure the output from sensor 36 by changing the voltage from D/A converter and monitoring the state of comparator 108.

The same technique is used to measure the output from sensor 88 to determine aperture, using D/A converter 102 and comparator 106. As shown in FIG. 4, the output signal from sensor 88 is connected to one input of comparator 106, whose other input is connected to the output from D/A converter 102, the same one used to send a position voltage to electronics section 99. D/A converter 102 is used for two functions: servo command generation and measurement of sensor voltage. But, it can only do one of them at a time. This means that the output voltage from sensor 88 can only be measured when the servo loop is disabled and the servo control section does not require the output voltage to hold position. This is acceptable because when the servo loop is enabled and there is no servo fault, then the servo control section ensures that the output voltage from sensor 88 is the same as that of D/A converter 102. On the other hand, when the servo loop is disabled and diaphragm actuator 62 is held against one of stops 80, 82, D/A converter can be used to measure the output voltage from sensor 88 with the actuator against the stop. There are two other signals shown in FIG. 4 that are sent from microcontroller 100' to controller 40. TX and RX are asynchronous communication lines that provide a link to controller 40.

Sensor 88 generates a continuous, essentially monotonic voltage over the range of motion of actuator 62. Position control of the iris is achieved by servo electronics section 99, in conjunction with sensor 88. A voltage signal sent to the servo from microcontroller 100' will cause the iris to move to the position where voltage signal from sensor 88 equals the input voltage from D/A converter 102. To calibrate the overall zoom lens system, it is necessary to determine two things. First, what should be the area of each aperture for a given magnification? Second, what voltage will be generated by sensor 88 at that position? If the voltage from sensor 88 can be measured at each specific aperture and stored in microcontroller 100', then the iris can be made to return to that same aperture by retrieving the value of the stored voltage and sending it to the servo controller. This is the basic premise of the method and apparatus for calibrating the iris in accordance with the invention.

The correspondence between a given aperture and a corresponding output voltage from sensor 88 is good as long as the operating characteristics of sensor 88 remain constant. Unfortunately, the output voltage of sensor 88 typically will change with a change in temperature. Therefore, there is an initial need to calibrate sensor 88. Changes in temperature will cause a change in output from photodiode 92 that will produce a slope gain change and offset for sensor 88. The way this can be calibrated is to use two reference points that will not change and measure the output of sensor 88 at these two points.

Figure 5:
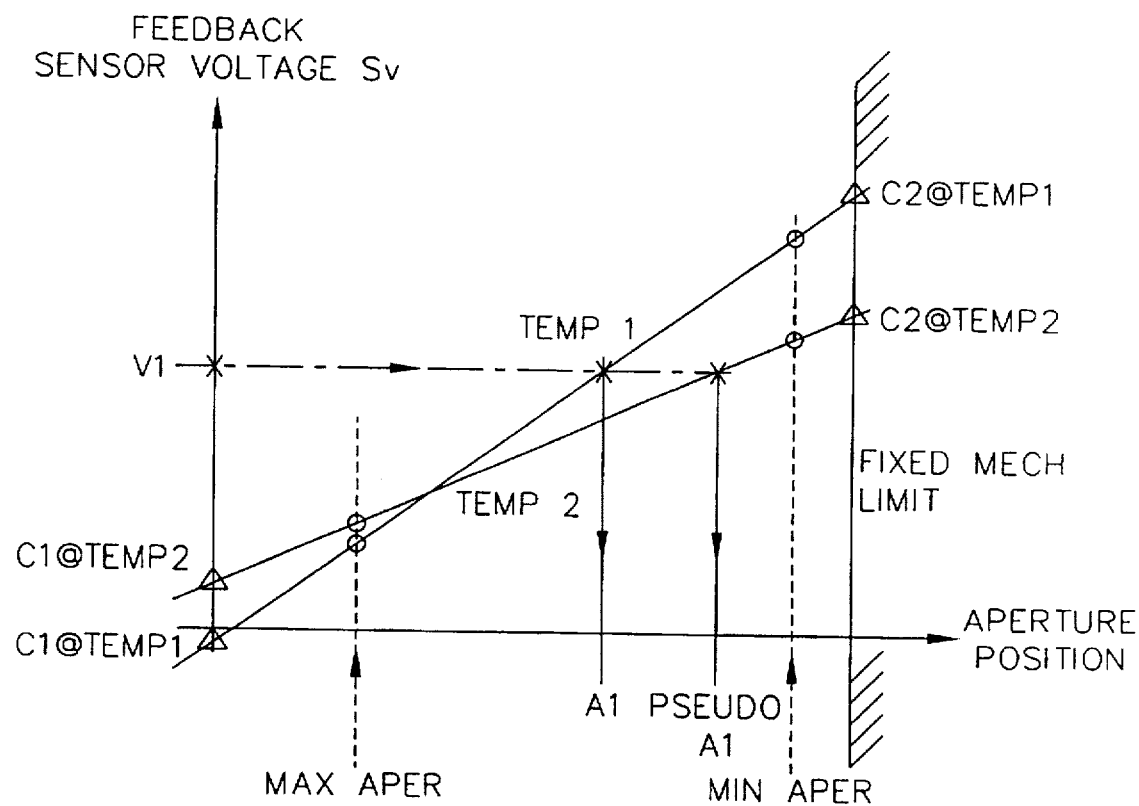
FIG. 5 shows a plot of variation in output of the sensor of FIG. 3 as a function of change in ambient temperature.

FIG. 5 shows along the X axis the positions of actuator 62. The Y axis is the output voltage of sensor 88. As the iris aperture is closed down the voltage increases from sensor 88. Each of the two sloped lines schematically represents an output of sensor 88 as actuator 62 is moved from full open to full closed. Each line shows a response of the sensor for a different temperature. The maximum and minimum apertures to be used in printer 10, labeled MAX APER and MIN APER, are shown as vertical dashed lines. Between MAX APER AND MIN APER, a typical aperture A1 is shown as a vertical dotted line. Aperture A1 corresponds to a voltage V1 from sensor 88 at a first time and at temperature TEMP1. If at some later time the temperature has changed to TEMP2 and microcontroller outputs the voltage VI to select aperture A1, then iris will in fact move to an incorrect aperture, labeled pseudo A1. This represents a drift of the system operation with temperature.

To the right beyond the MIN APER is a line corresponding to mechanical stop 82 which limits movement of actuator 62. This position will not change and a measurement of output voltage from sensor 88 can be made and labeled C2. Similarly, actuator 62 could be moved to the left beyond MAX APER and driven against mechanical stop 80, not shown in FIG. 5. This would be a second reference point where output voltage from sensor 88 could be measured. An alternate method may be used, that of turning off current to infrared emitting diode 94. This will effectively determine the sensor's output when strip 86 has a maximum optical density and will transmit essentially no radiation, as would be the case if the actuator were against stop 80. The output from the sensor at this position is labeled C1.

Calibrating Position Feedback Sensor 88

Microcontroller 100' sends a command voltage to electronics section 99 to move actuator 62 against stop 82, the extreme closed position and then disables the servo control section. The output voltage of sensor 88, equivalent to calibration constant C2, is then measured by the microcontroller 100' using D/A converter 102, comparator 106 and a conventional successive approximation algorithm. The current going to diode 94 is then turned off the output voltage of sensor 88, equivalent to calibration constant C1, is again measured. These two constants are retained in the microcontroller for use during calibration of the iris.

Calibrating Iris Diaphragm Assembly 26

The areas of aperture 52 for various stop settings for each magnification of zoom lens system 16 are determined using an external measurement system comprising light intensity sensor 36 in the optical path. The output voltage of sensor 36 is proportional to the intensity of light passing through iris diaphragm assembly 26 and, hence, to the area of variable aperture 52. Since this is a relative measurement, the intensity of light passing through fixed, maximum aperture 54 is used as a reference to all measurements of light passing through all other apertures. As previously indicated, aperture 54 may have a diameter of about 18 mm.

Microcontroller 100' preferably should have 512 bytes of EEPROM memory to provide sufficient storage capacity for a Look Up Table (LUT) in which to store a correlation among magnification settings and sensor values for iris position feedback sensor 88 at each stop setting of the iris. For example, an internal calibration LUT may include 14 stored sensor values for fourteen different apertures (two bytes) for each magnification setting. Those skilled in the art will appreciate, however, that fewer or more values could be provided, depending on the number of apertures desired to operate printer 10. The sensor values represent the positions of iris blades 44 as a function of the output voltage of sensor 88. For example, the sensor values may be determined so that the fourteen apertures are spaced at quarter stop intervals down from the largest aperture. For example, if zoom lens system 16 has magnification settings from about 3.0× to about 11.0×, the LUT may have sufficient storage capacity for, say, 11 different magnification settings covering the full range. For example, a magnification setting of about 6.5× would be unique because its widest aperture would be the fixed aperture 54 having a diameter of about 18.0 mm. The light level through lens system 16 at this magnification and aperture would be used as the reference for all other magnifications. The output voltage PMAX from sensor 36 at this aperture and magnification is stored in EEPROM memory. PMAX is the reference maximum voltage for the photometer at the widest aperture.

The uniform intensity of light through an aperture stop is proportional to the area of the aperture. So, for a given exposure at a given aperture, the exposure can be increased or decreased by one stop if the area of the aperture is doubled or halved, respectively. Decreasing the aperture one stop decreases its area by a factor of 0.5. On a logarithmic scale, this becomes $Log_{10}0.5=-0.301$. A one stop increase will be a $Log_{10}$ change in area of +0.301. Therefore, quarter stop decrements will be:

$[Log_{10}0.5]/4=-0.3/4.$

In general each new aperture area will be defined by:

$$A_n = A_o * (10^{-0.3 \, n/N})$$ <EQ. 1> where $A_n$ is the decremented aperture area; $A_o$ is the starting aperture area; N is the number of decrements per stop (4 in this example); and n is the particular decrement number. Thus, each new aperture area can be determined by multiplying the starting arpeture area by a coefficient $Cn=10^{-0.3 \, n/4}$. The values for the 14 stop decrements are:

| Decrement Number "n" | Area Coefficient "Cn" |
|---|---|
| 0 | 1.0 |
| 1 | 0.841395 |
| 2 | 0.707946 |
| 3 | 0.595662 |
| 4 | 0.501187 |
| 5 | 0.421697 |
| 6 | 0.354813 |
| 7 | 0.298538 |
| 8 | 0.251189 |
| 9 | 0.211349 |
| 10 | 0.177828 |
| 11 | 0.149.624 |
| 12 | 0.125893 |
| 13 | 0.105925 |

Sensor 36 does not measure directly the area of aperture 52, but its output voltage is proportional to this area. If the output voltage from sensor 36 is measured at fixed aperture 54, then quarter stop decrements from this aperture can be produced by using microcontroller 100' to multiply this voltage by each of the coefficients $C_n$ in turn and then send the calculated value to D/A converter 104. As the iris aperture is slowly closed down by servo control section 98, the output voltage from sensor 36 will decrease as the light through the smaller apertures is reduced. At the point where the output voltage from sensor 36 matches the calculated value, comparator 104 will change state and the iris motion will be stopped. At this point, the output voltage Sv(n) of feedback sensor 88 is measured. In fact if servo control section 98 is working properly, all that is needed is the value of the output of D/A converter 102, since servo control section 98 assures that the output of feedback sensor 88 tracks the voltage of D/A converter 102. This output voltage is then adjusted by an equation containing calibration constants C1 and C2 determined in the feedback sensor calibration procedure. The adjusted value is stored in the LUT location corresponding to the particular aperture number and magnification being calibrated. The formula for the adjusted value for the LUT is:

$$LUT(n) := \frac{Sv(n) - C1}{C2 - C1}$$ <EQ. 2> where LUT(n) is the Look Up Table value to be stored; n is the aperture number; Sv(n) is the output voltage of sensor 88 at aperture n; and C1 and C2 are the constants from the feedback calibration. After all the aperture stop values have been stored in the LUT, the iris can be commanded to return to any aperture location, by looking up the constant in the table and calculating the position feedback voltage from the following formula:

$$Sv(n) := LUT(n) \cdot (C2 - C1) + C1$$ <EQ. 3>

Feedback sensor 88 must be recalibrated periodically to prevent drift errors from changes in temperature; so, constants C1 and C2 will change. This will give different Sv(n) values for the same LUT but will produce the same aperture. For example, a starting aperture would be known for the approximately 6.5× magnification and would be the approximately 18 mm fixed aperture 54. A starting aperture for any other magnification can be determined from this fixed aperture. The calibration procedure is divided into three parts depending on whether the magnification $M_x$ is equal to 6.5×, less than 6.5×, or greater.

When the magnification is equal to the reference of about 6.5×, then determining the starting widest aperture is just a matter of opening iris blades 44 beyond fixed aperture 54.

The output voltage of sensor 36 at this condition, PMAX, is stored in microcontroller 100' as the reference light level for other magnifications. This value is then multiplied by the constant C1 from EQ. 1 and output to D/A converter 104. Microcontroller 100' then instructs servo control section 98 to slowly close aperture 52 until comparator 108 changes state. At this point the output voltage of sensor 36 matches the value calculated from PMAX and the area of aperture 52 will be at the desired stop position. The output voltage Sv(n) of feedback sensor 88, which is the value in D/A converter 102, is then adjusted by EQ. 2 and entered into the Look Up Table at the location of the first stop down. The process then continues for all the remaining coefficients calculated by EQ. 1 until all stop locations have been calibrated.

If the magnification $M_x$ is less than about 6.5, in the range from about $3.0 \times \leq M_x \leq$ about $6.5 \times$, the previously determined PMAX is sent to D/A converter 104 and to comparator 108, where it can be compared with the current output voltage of sensor 36. Lens system 16 then is zoomed to the new, lower magnification. Microcontroller 100' then instructs servo control section 98 to slowly close aperture 52 until sensor 36 produces an output voltage equal to PMAX. This is the starting aperture for this new magnification setting. All the succeeding aperture stops down from this are calculated in the same way as described for the 6.5× case. Indeed, the output voltages for sensor 36 for each aperture will be identical to those of the 6.5× case since they start from the same value. The output voltages from feedback sensor 88, however, will be different from those of the 6.5× case.

For magnifications greater than about 6.5×, a different procedure is needed. The starting light level H and, hence, the starting aperture are determined by the formula $$H = H_r \left( \frac{65}{M_x} \right)^2 \qquad \text{<EQ. 4>}$$

where $H_r$ is the light at the reference magnification of about 6.5× and fixed aperture 54; and $M_x$ is the new magnification which ranges from about $6.5 \times < M_x \leq$ about 11.0×. The light value $H_r$ is the value that produced output voltage PMAX from sensor 36; so, this is multiplied by the ratio of the magnifications squared to give a new reference. Because Eq. 4 accounts for $M_x$, the lens need not be moved to the new magnification $M_x$. Microcontroller 100' then instructs servo control section 98 to slowly closed aperture 52 until the output voltage from sensor 36 equals the new reference. This is the starting aperture for this magnification and all the quarter stop decrements are then calibrated from this aperture as in the preceding example. When the calibration is complete, controller 40 causes actuator 38 to remove sensor 36 from its location near the paper plane; and printer 10 is ready for use. The technique using Eq. 4 also may be used for magnifications less than about 6.5×. Those skilled in the art will appreciate that when Eq. 4 is used, the lens need not be present during calibration of the iris.

Upon completion of this calibration, iris control electronics 28 and controller 40 have stored set points for feedback sensor 88 for each stop setting of each magnification. These can be updated as often as necessary to account for changes in ambient temperature. Later, when printer 10 wishes zoom lens system 16 to move to a particular magnification and stop setting, the controller simply consults the LUT, makes any necessary temperature adjustments, and then moves the lens system and adjusts the iris accurately and repeatably to the desired setting.

Parts List

| Parts List | | | |
|---|---|---|---|
| 10 | photographic printer | 36 | light intensity sensor |
| 12 | light source | 38 | actuator |
| 14 | negative filmstrip | 40 | programmable controller |
| 16 | zoom lens system | 42 | plate-like frame |
| 18 | upper movable lens group | 44 | movable iris blade |
| 20 | actuator | 46 | stem portion of 44 |
| 22 | lower movable lens group | 48 | curved end portion of 44 |
| 24 | actuator | 50 | pivot pin |
| 26 | iris diaphragm assembly | 52 | variable aperture |
| 28 | iris control electronics | 54 | maximum, reference aperture through 42 |
| 30 | flexible cable | | |
| 32 | beam of light | 56 | yoke at outer end of 46 |
| 34 | photographic paper | 58 | drive belt attached to all 56 |
| 60 | recess in 42 | 94 | infrared emitting diode |
| 62 | diaphragm actuator | 96 | operational amplifier |
| 64 | support plate | 98 | servo-control section |
| 66 | top plate | 99 | electronics section of 98 |
| 68 | support post | 100 | microcontroller section |
| 70 | screw | 100' | microcontroller chip |
| 72 | drive coil carried on 64 | 101 | power amplifier of 98 |
| 74 | flexible electrical connector | 102, 104 | digital to analog converter |
| 75 | terminal board | 106, 108 | comparator |
| 76 | arcuate permanent magnet | 107 | amplifier for signal from 36 |
| 78 | radial projection of 64 | 110 | power line from 98 to 88 |
| 80, 82 | stop pins | 112 | feedback line from 88 to 98 |
| 84 | radial extension of 64 | 114 | servo enable line |
| 86 | variable density transparent strip | 116 | sensor 88 enable line |
| 88 | sensor with light source and detector | 118 | servo fault signal line |
| 90 | electrical connection board | 120 | shielded cable |
| 92 | photodiode | | |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A method of calibrating an adjustable iris in a photographic printer including a light source, a sensor intended to produce a variable output in response to changes in an aperture of the iris, a lens system for projecting an image from a photographic negative illuminated by the light source, and an image plane where the projected image is received by a photographic paper, the iris being located in a light path from the light source so as to control an amount of light passing from the negative through the lens system to the paper, said method comprising steps of:

a) setting the iris at a reference aperture for a reference magnification of the lens system;
   b) near the image plane, measuring a reference intensity of light transmitted from the light source through the iris, in an absence of a photographic negative;
   c) calculating a modified intensity of light to be measured near the image plane after a predetermined change in stop number of the iris;
   d) changing the aperture of the iris in a direction to cause the intensity of light near the image plane to change from the reference intensity to the calculated modified intensity;
   e) during the changing, measuring the intensity of light near the image plane;
   f) stopping the changing of the aperture when the intensity measured near the image plane equals the calculated modified intensity;
   g) measuring an output Sv of the sensor when the intensity of light near the image plane equals the calculated modified intensity;
   h) repeating steps c) to g) for successive predetermined changes in stop number of the iris; and
   i) storing for use during operation of the photographic printer a correlation for each changed stop number among magnification settings of the lens system, the changed stop number and the output of the sensor at the changed stop number.

2. A method according to claim 1, wherein the reference aperture is a maximum aperture for the reference magnification and the changing step reduces the area of the aperture.

3. A method according to claim 1, wherein the lens system is a zoom lens having a plurality of magnification settings, comprising further steps of:

j) changing the magnification setting of the lens system to a lower magnification;
   k) changing the aperture of the iris in a direction to cause the intensity of light near the image plane to equal the reference intensity;
   l) repeating steps c) to i) for the lower magnification.

4. A method according to claim 3, wherein the reference aperture is a maximum aperture for the reference magnification and the aperture changing steps reduce the area of the aperture.

5. A method according to claim 1, wherein the lens system is a zoom lens having a plurality of magnification settings, comprising further steps of:

j) calculating a modified reference intensity by multiplying the reference intensity by the square of the quantity: the reference magnification divided by a changed magnification;
   k) changing the aperture of the iris in a direction to cause the intensity of light near the image plane to equal the modified reference intensity;
   l) repeating steps c) to i) for the changed magnification.

6. A method according to claim 5, wherein the reference aperture is the maximum aperture for the reference magnification and the aperture changing steps reduce the area of the aperture.

7. A method according to claim 1, wherein the output of the sensor varies from a maximum to a minimum aperture of the iris, further comprising steps of:

prior to setting the iris at the reference aperture, at an ambient temperature of sensor determining an output C1 of the sensor corresponding to a predetermined maximum aperture and determining an output C2 of the sensor corresponding to a predetermined minimum aperture; and
   calculating a modified sensor output for the storing step, in accordance with the following relationship:

$$LUT(n)=(Sv(n)-C1)/(C2-C1),$$

where LUT(n) is a look up table value to be stored, n is an aperture number and Sv(n) is the sensor output at aperture n.

8. Apparatus for calibrating an adjustable iris in a photographic printer including a light source, a sensor intended to produce a variable output in response to changes in an aperture of the iris, a lens system for projecting an image from a photographic negative illuminated by the light source, and an image plane where the projected image is received by a photographic paper, the iris being located in a light path from the light source so as to control an amount of light passing from the negative through the lens system to the paper, said apparatus comprising:

a) means for setting the iris at a reference aperture for a reference magnification to of the lens system;
   b) means, near the image plane, for measuring a reference intensity of light transmitted from the light source through the iris, in an absence of a photographic negative;
   c) programmed computer means for calculating a modified intensity of light to be measured near the image plane after a predetermined change in stop number of the iris;
   d) means for changing the aperture of the iris in a direction to cause the intensity of light near the image plane to change from the reference intensity to the calculated modified intensity;
   e) means for stopping the changing of the aperture when the intensity measured near the image plane equals the calculated modified intensity;
   f) means for measuring an output Sv of the sensor when the intensity of light near the image plane equals the calculated modified intensity; and
   g) means for storing for use during operation of photographic printer a correlation for each changed stop number among magnification settings of the lens system, the changed stop number and the output of the sensor at the changed stop number.

9. Apparatus according to claim 8, wherein the reference aperture is a maximum aperture for the reference magnification and the changing step reduces the area of the aperture.

10. Apparatus according to claim 8, wherein the lens system is a zoom lens having a plurality of magnification settings, further comprising:

h) means for changing the magnification setting of the lens system to a lower magnification; and i) means for changing the aperture of the iris in a direction to cause the intensity of light near the image plane to equal the reference intensity at a lower magnification.

11. Apparatus according to claim 10, wherein the reference aperture is a maximum aperture for the reference magnification and the aperture changing reduces the area of the aperture.

12. Apparatus according to claim 8, wherein the lens system is a zoom lens having a plurality of magnification settings, further comprising:

h) means for calculating a modified reference intensity by multiplying the reference intensity by the square of the quantity: the reference magnification divided by a changed magnification; and i) means for changing the aperture of the iris in a direction to cause the intensity of light near the image plane to equal the modified reference intensity.

13. Apparatus according to claim 12, wherein the reference aperture is the maximum aperture for the reference magnification and the aperture changing reduces the area of the aperture.

14. Apparatus according to claim 8, wherein the output of the sensor varies from a maximum to a minimum aperture of the iris, further comprising:

means for determining, prior to setting the iris at the reference aperture, at an ambient temperature of sensor, an output C1 of the sensor corresponding to a predetermined maximum aperture and an output C2 of the sensor corresponding to a predetermined minimum aperture; and programmed computer means for calculating a modified sensor output for the storing, in accordance with the following relationship:

$$LUT(n)=(Sv(n)-C1)/(C2-C1),$$

where $LUT(n)$ is a look up table value to be stored, $n$ is an aperture number and $Sv(n)$ is the sensor output at aperture $n$.

* * * * *